US010023264B2

United States Patent
Hayslett et al.

(10) Patent No.: US 10,023,264 B2
(45) Date of Patent: Jul. 17, 2018

(54) COOLING METHOD FOR E-BIKE POWER AND ENERGY SYSTEMS

(71) Applicant: GM Global Technology Operations LLC, Detroit, MI (US)

(72) Inventors: Steven L. Hayslett, Troy, MI (US); Jess R. Bailie, Shelby Township, MI (US); Peter Bostwick, Rochester, MI (US); Richard J. Lannen, Royal Oak, MI (US); Wade W. Bryant, Grosse Pointe Farms, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 274 days.

(21) Appl. No.: 14/677,627

(22) Filed: Apr. 2, 2015

(65) Prior Publication Data
US 2016/0288874 A1     Oct. 6, 2016

(51) Int. Cl.
    *B62M 6/40*       (2010.01)
    *B62M 6/80*       (2010.01)
    *B62K 19/02*      (2006.01)

(52) U.S. Cl.
    CPC .............. *B62M 6/80* (2013.01); *B62K 19/02* (2013.01); *B62M 6/40* (2013.01)

(58) Field of Classification Search
    CPC ........... B62M 6/40; B62M 6/80; B62K 19/02; B62K 3/06
    See application file for complete search history.

(56) References Cited

U.S. PATENT DOCUMENTS 3,773,131 A * 11/1973 Jaulmes ................... B62M 6/45
                                                   180/206.5
5,577,747 A * 11/1996 Ogawa ..................... B60K 1/04
                                                    180/220
(Continued)

FOREIGN PATENT DOCUMENTS

DE          967034 C     9/1957
DE      2113968 A1    10/1971
(Continued)

OTHER PUBLICATIONS

German Office Action dated Feb. 3, 2017 ; Application No. 10 2016 105 933.1; Applicant: GM Global Technology Operations LLC.; 5 pages.
(Continued)

*Primary Examiner* — Joseph M Rocca
*Assistant Examiner* — Maurice L Williams
(74) *Attorney, Agent, or Firm* — BrooksGroup

(57) ABSTRACT

An electric cycle with a frame that may include a tube and an opening. The tube may extend from a first end to a second end and may define a tube interior volume in fluid communication with the opening. An electric power unit may be mounted to the frame proximal the second end of the tube and may have a cooling air inlet and an exhaust port. A cooling path may be defined through the tube interior volume and at least a portion of the electric power unit. The cooling path may be in fluid communication with the opening so that air may flow into the opening, through the tube, into the cooling air inlet and out of the exhaust port of the electric power unit.

19 Claims, 3 Drawing Sheets

(56) References Cited

U.S. PATENT DOCUMENTS

| | | | | |
|---|---|---|---|---|
| 5,788,007 A * | 8/1998 | Miekka | ................. | B60L 3/0061 180/205.1 |
| 6,142,123 A * | 11/2000 | Galasso | ................... | B62M 7/02 123/486 |
| 7,264,072 B2 * | 9/2007 | Yoshikawa | ............ | F02M 35/04 123/184.21 |
| 7,748,746 B2 * | 7/2010 | Beiber Hoeve | ......... | B62J 35/00 180/219 |
| 7,931,110 B2 * | 4/2011 | Nishiura | ................. | B60L 11/18 180/218 |
| 8,096,381 B2 * | 1/2012 | Castellani | .............. | B62K 11/04 180/219 |
| 8,973,697 B2 * | 3/2015 | Matsuda | ................ | B62K 11/04 123/41.72 |
| 9,108,527 B2 * | 8/2015 | Platz | ........................ | B60K 1/04 |
| 9,284,926 B2 * | 3/2016 | Miki | ...................... | B62K 11/04 |
| 2005/0051375 A1 * | 3/2005 | Momosaki | ....... | F02M 35/10013 180/219 |
| 2006/0065452 A1 * | 3/2006 | Tomoshige | .............. | B62M 6/65 180/65.1 |
| 2008/0289893 A1 * | 11/2008 | Iwanaga | .................. | B62J 99/00 180/229 |
| 2010/0096226 A1 * | 4/2010 | Gelb | ..................... | F16D 65/847 188/264 AA |
| 2010/0163326 A1 * | 7/2010 | Takamura | ................ | B60K 1/04 180/68.5 |
| 2010/0193275 A1 * | 8/2010 | Song | ..................... | B62K 11/04 180/219 |
| 2012/0111651 A1 * | 5/2012 | Irie | ........................ | B62K 11/04 180/65.1 |
| 2012/0175175 A1 * | 7/2012 | Gomi | ...................... | B62J 1/005 180/21 |
| 2012/0192784 A1 * | 8/2012 | Gimlan | .................. | H02K 7/025 116/200 |
| 2013/0233634 A1 * | 9/2013 | Matsuda | ................ | B62K 11/06 180/220 |
| 2013/0256049 A1 * | 10/2013 | Matsuda | ................ | B62K 11/06 180/220 |
| 2017/0015382 A1 * | 1/2017 | Takakuwa | .............. | B62K 11/04 |

FOREIGN PATENT DOCUMENTS

| | | | | |
|---|---|---|---|---|
| DE | 102005016043 A1 | | 5/2006 | |
| DE | 102008047087 A1 | | 3/2010 | |
| DE | 102010026650 A1 * | | 1/2012 | ............ B62M 6/55 |
| DE | 202014007473 U1 | | 9/2015 | |
| DE | 202016002960 U1 * | | 6/2016 | ............ B62M 6/40 |
| JP | 59118529 A * | | 7/1984 | |
| WO | WO 2014092556 A1 * | | 6/2014 | ............ B62K 25/08 |

OTHER PUBLICATIONS

Canadian Office Action dated Jan. 12, 2017 ; Application No. 2,923,719 Applicant:GM Global Technology Operations LLC. ; 4 pages.

German Office Action dated Sep. 11, 2017 ; Application No. 10 2016 105 933.1; Applicant: GM Global Technology Operations LLC.; 5 pages.

* cited by examiner

US 10,023,264 B2

COOLING METHOD FOR E-BIKE POWER AND ENERGY SYSTEMS

TECHNICAL FIELD

The field to which the disclosure generally relates includes electric cycles, and more particularly, includes cooling systems for electric cycles.

BACKGROUND

An electric cycle may have various wheel arrangements and may include an on-board electric motor that can be used for propulsion.

SUMMARY OF ILLUSTRATIVE VARIATIONS

In a number of illustrative variations an electric cycle may have a frame that may include a tube and an opening. The tube may extend from a first end to a second end and may define a tube interior volume in fluid communication with the opening. An electric power unit may be mounted to the frame proximal the second end of the tube and may have a cooling air inlet and an exhaust port. A cooling path may be defined through the tube interior volume and at least a portion of the electric power unit. The cooling path may be in fluid communication with the opening so that air may flow into the opening, through the tube, into the cooling air inlet and out of the exhaust port of the electric power unit.

In other illustrative variations, an electric cycle may include a frame. A first tube may be provided as part of the frame and may have a first end and a second end. A head tube may be connected to the first end. An electric power unit may be mounted to the frame near the second end. A cooling path may be defined through the head tube, the first tube and the electric power unit. The cooling path may be open through the head tube so that air may flow into the cooling path and through the electric power unit for cooling.

In a number of additional illustrative variations, a product for use with an electric cycle may include an electric power unit that may be operable to drive the electric cycle. A rotor may be configured to rotate in the electric power unit. A battery unit may be disposed in the electric power unit to provide power to rotate the rotor. At least one deflector may be disposed in the electric power unit to direct cooling air onto the battery unit. A crank may be manually operated and may be configured to operate with the rotor to drive the electric cycle.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
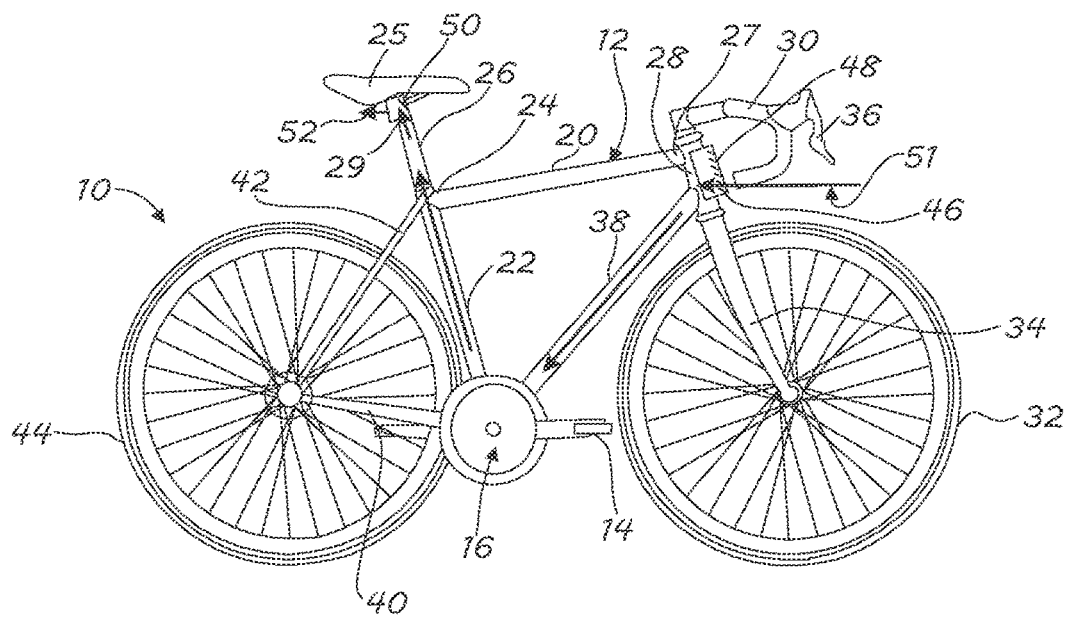
FIG. 1 is a schematic representation of an electric cycle according to a number of variations.

FIG. 1 illustrates a number of variations which may include an electric cycle 10. The electric cycle 10 may exhibit a structure and a method for providing forced and free convection cooling of electrified components. The structure and method may provide cooling air to the electrical components by routing it through the frame 12. Various features may provide protection against the entrainment of water and contaminates in the cooling air.

Figure 3:
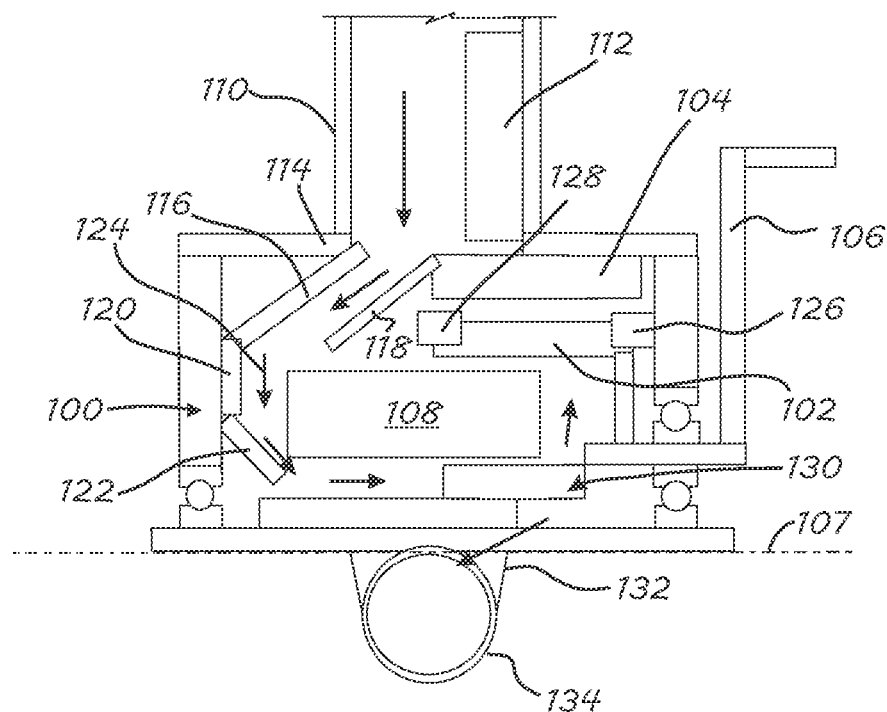
FIG. 3 is a schematic representation of the power unit area of an electric cycle according to a number of variations.

More specifically, the electric cycle may be a bicycle, tricycle, or four-wheel electric cycle having a crank assembly 14 constructed and arranged to allow a rider to provide propulsion input thereto. The electric cycle 10 may also include an electric power unit in the form of a motor-generator unit 16 which may be used to propel the electric cycle 10 forward and optionally, to generate electricity from motor braking. In any of a number of variations, the motor-generator unit 16 may be powered by any of a number of types of battery assemblies, for example, as illustrated in FIG. 3. The motor-generator unit 16 may be attached to the cycle frame 12.

In one variation, the cycle frame 12 may include a top tube 20 which may have an end 24 connected to a seat tube 22. At a forward opposite end 27, the top tube 20 may be connected to a head tube 28. A saddle 25 may be engaged with a seat post 26 that may be connected with the seat tube 22. Handlebars 30 may be rotatably attached to the head tube 28, and the handlebars 30 may be operatively connected to a front wheel 32 by way of a wheel fork 34. A brake lever 36 may be provided on the handlebars 30, if desired. A down tube 38 may extend from the head tube 28, generally in a downward and rearward direction. The lower proximal ends of the seat tube 22 and the down tube 38 may be connected to the area of the frame 12 supporting the crank assembly 14 and the motor-generator unit 16. The frame 12 may also include chain stays 40 and seat stays 42 that may support a rear wheel 44.

The motor-generator unit 16 may generate heat while operating. To channel cooling air into the motor-generator unit 16, an air inlet opening 46 may be provided in the head tube 28. The air inlet opening 46 may include a grille 48 to provide protection against the entry of water and contaminants. The air inlet opening 46 may provide an opening into the interior volume of the hollow head tube 28, which in turn may be open to the interior volume of the hollow down tube 38. The down tube 38 may channel cooling air flow to the motor-generator unit 16. After circulation through the motor-generator unit 16, the cooling air may exit through the hollow seat tube 22. Flow through the seat tube 22 may continue through the hollow seat post 26. The warmed cooling air may be directed at the underside of the saddle 25 as represented by the arrow 29, or a deflector 50 may be repositionable to direct the exhaust 52 rearward away from the saddle 25. The deflector 50 may be moved between positions that direct flow at the saddle 25 or directly out the saddle exhaust port 52. The cooling air flow path 51 may include the inlet 46, the head tube 28, the down tube 38, the motor-generator unit 16, the seat tube 22, the seat post 26, and the saddle exhaust port 52. Through the cooling air flow path 51, clean cooling air may be circulated through the motor-generator unit 16.

Figure 2:
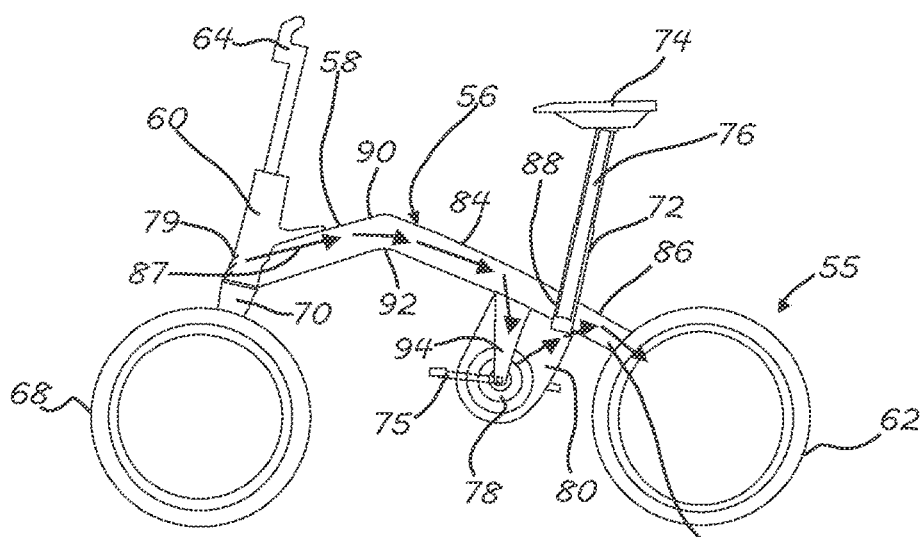
FIG. 2 is a schematic representation of an electric cycle according to a number of variations.

A number of additional variations may be described in relation to FIG. 2 which illustrates an electric cycle 55. The electric cycle 55 may include a single tube frame 56, with a hollow tube 58 running between the head tube 60 and the rear wheel 62. The rear wheel 62 and the frame 56 may include a hubless connection, a uniblade fork connection, or a conventional fork connection. Handlebars 64 may be rotatably attached to the head tube 60, and the handlebars 64 may be operatively connected to a front wheel 68 by way of a wheel fork 70. The wheel fork 70 may be connected with the front wheel 68 by means of a hubless connection, a uniblade fork connection, or a conventional fork connection. A seat tube 72 may be connected to the frame 56 at the tube 58. A saddle 74 may be connected to the seat tube 72 though a seat post 76. The electric cycle 55 may have a crank assembly 75, constructed and arranged to allow a rider to provide propulsion input thereto.

The electric cycle 55 may also include an electric power unit in the form of a motor-generator unit 78 which may be used to propel the electric cycle 55 forward and optionally, to generate electricity from motor braking. In any of a number of variations, the motor-generator unit 78 may be powered by any of a number of types of battery assemblies, for example, as illustrated in FIG. 3. The motor-generator unit 78 may be attached to the cycle frame 56 by a housing 80.

In a number of variations, cooling air may be provided to the motor-generator unit 78. An air inlet 79 may be provided in the head tube 60 and the interior of the head tube 60 may be open to the interior of the hollow tube 58. The interior of the hollow tube 58 may be divided into two segments 84 and 86 by a barrier wall 88. The barrier wall 88 may be formed in conjunction with the connection between the seat tube 72 and the hollow tube 58. To separate the segment 84 from the segment 86 the seat tube may extend into or through the hollow tube 58. The hollow tube 58 may be formed with an arch 90 so that the lower surface 92 at the pinnacle of the arch is higher than the inlet 79. In the event of water or contaminant entry through the inlet 79, the unwanted material may settle to the bottom of the hollow tube and run back toward, and out through, the inlet 79.

A duct 94 may be provided to connect the inside of the segment 84 with the center of the motor-generator unit 78 to direct cooling air. Cooling air may circulate within the motor-generator unit 78 and may be channeled through the housing 80 exiting into the segment 86. An exhaust outlet 96 may be provided from the segment 86 to expel the warmed cooling air. The cooling air flow path 87 may include the inlet 79, the head tube 60, the segment 84 of the hollow tube 58, the duct 94, the housing 80, the segment 86 of the hollow tube 58, and the exhaust outlet 96. Through the cooling air flow path 87, clean cooling air may be circulated through the motor-generator unit 78.

Further details of a number of variations may be described in relation to FIG. 3 which illustrates an electric power unit area of an electric cycle, such as the electric cycle 10. The power unit 100 may generally include an electric motor with a rotor 102 and a stator 104. The rotor 102 may be operatively connected with a chain ring and along with crank 106, may rotate about a center line 107 and may be used to propel the associated cycle. A battery unit 108 may be positioned within the power unit 100 for powering the electric motor. In addition, the electric motor may be configured to operate as a generator to supply power to the battery unit 108 for storage.

Cooling air may be supplied to the power unit 100 through a hollow tube which may be the down tube 110. The down tube 110 may also house an electronic unit 112 that may be used to control operation of the power unit 100. The down tube 110 may open through a cooling air inlet into the housing 114 within which a series of deflectors 116, 118, 120, 122 may define a cooling channel 124 that is directed over and around the battery unit 108. Circulation of cooling air within the housing 114 may be aided by a series of fan blades including blades 126 and 128 that may be connected to the rotor 102. A gearing device 130 may be positioned in the housing 114 and may be operatively configured with the rotor 102 to provide drive torque from the power unit 100. An exhaust port connection 132 may be provided between the housing 114 and a seat tube 134 to allow air to exit the power unit 100 to extract heat.

Figure 4:
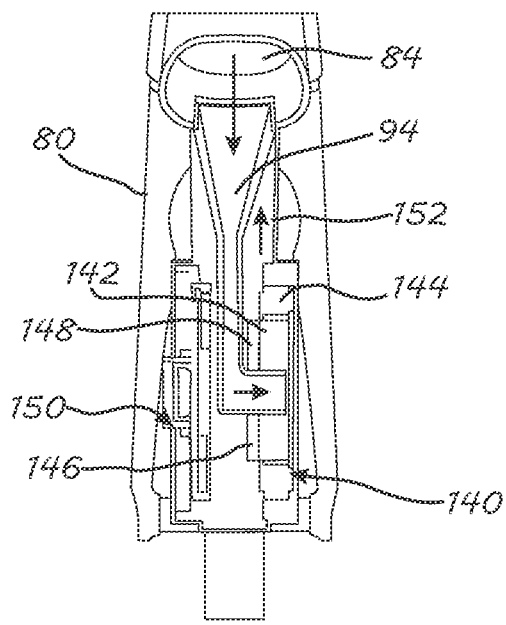
FIG. 4 is a schematic representation of the power unit area of an electric cycle according to a number of variations.

Additional details of a number of variations may be described in relation to FIG. 4 which illustrates an electric power unit area of an electric cycle, such as the electric cycle 55. The power unit 140 may generally include an electric motor with a rotor 142 and a stator 144. As described in relation to FIG. 2, the duct 94 may connect the hollow tube segment 84 through a cooling air inlet to the center of the rotor 142. The rotor 142 may include a series of fan blades including blades 146 and 148 to aid in circulating cooling air within the housing 80. A gearing unit 150 may be configured with the rotor 142 to operatively provide driving torque from the power unit 140 to the associated electric cycle. A second duct 152 may be provide an exhaust port to direct air out of the housing and into the hollow tube segment 86 as shown in FIG. 2 to be exhausted.

Figure 5:
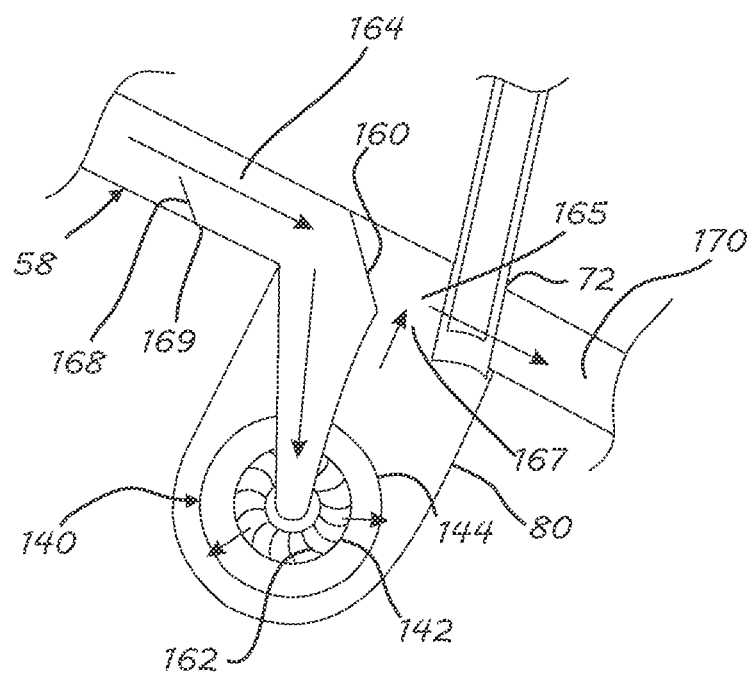
FIG. 5 is a schematic representation of the power unit area of an electric cycle according to a number of variations.

A number of additional variations may be described in relation to FIG. 5 which illustrates an electric power unit area of an electric cycle, such as the electric cycle 55. The power unit 140 may generally include an electric motor with a rotor 142 and a stator 144. A diverter 160 may be positioned within the hollow tube 58, separating it into segments 164 and 165, and directing flow into the duct 94. The duct 94 may connect the hollow tube segment 164 to the center of the rotor 142. The rotor 142 may include a series of fan blades 162 to aid in circulating cooling air within the housing 80. The interior of the housing 80 may be open to the segment 165 through and opening 167 in the hollow tube 58. Within the segment 165, air may flow past the seat tube 72 and may exit rearward of the seat tube 72 and through the passage 170 to be exhausted. The hollow tube 58 may further include a partial barrier 168 connected to the interior bottom of the tube wall 169 to provide an additional debris trap.

Through the described illustrative variations, heat transfer away from a cycle's power unit may be improved by providing forced and free convection. Cooling air may be routed through the cycle's frame to assist in providing flow and in cleaning the intake air. The following description of variants is only illustrative of components, elements, products and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may involve an electric cycle with a frame that may include a tube and an opening. The tube may extend from a first end to a second end and may define a tube interior volume in fluid communication with the opening. An electric power unit may be mounted to the frame proximal the second end of the tube and may have a cooling air inlet and an exhaust port. A cooling path may be defined through the tube interior volume and at least a portion of the electric power unit. The cooling path may be in fluid communication with the opening so that air may flow into the opening, through the tube, into the cooling air inlet and out of the exhaust port of the electric power unit.

Variation 2 may include an electric cycle according to variation 1 wherein the frame may include a head tube that includes the opening. The opening may open into a head tube interior volume. The head tube may be connected to the tube at the first end such that the head tube interior volume is in fluid communication with the tube interior volume, and the cooling path.

Variation 3 may include an electric cycle according to variation 1 or 2 wherein the frame may include a seat tube and a saddle supported by the seat tube. The seat tube may define an open interior. The open interior may be in a fluid opening condition into the electric power unit so that air may exit the electric power unit through the seat tube.

Variation 4 may include an electric cycle according to variation 3 wherein the seat tube may have a saddle exhaust port that opens to the cooling path to allow air out of the cooling path.

Variation 5 may include an electric cycle according to variation 4 wherein the saddle exhaust port may direct air from the cooling port and at the saddle.

Variation 6 may include an electric cycle according to variation 5 and may include a seat post connecting the saddle to the seat tube, wherein air may exit the cooling path through the seat post.

Variation 7 may include an electric cycle according to any of variations 1 through 6 wherein the tube may have a first segment and a second segment. The first segment may be separated from the second segment. Air may flow into the cooling air inlet of the electric power unit through the first segment and may exit through the exhaust port of the electric power unit and through the second segment.

Variation 8 may include the electric cycle according to any of variations 1 through 7 and may include a rotor connected in the electric power unit. The rotor may have an open center. A duct may be disposed between the tube and the open center to direct air to the open center.

Variation 9 may include the electric cycle according to any of variations 1 through 8 and may include a fan positioned in the electric power unit. The fan may supplement air flow through the electric power unit.

Variation 10 may include the electric cycle according to any of variations 1 through 9 and may include a battery positioned in the electric power unit. The cooling path may be directed around the battery.

Variation 11 may involve an electric cycle that may include a frame. A first tube may be provided as part of the frame and may have a first end and a second end. A head tube may be connected to the first end. An electric power unit may be mounted to the frame near the second end. A cooling path may be defined through the head tube, the first tube and the electric power unit. The cooling path may be open through the head tube so that air may flow into the cooling path and through the electric power unit for cooling.

Variation 12 may include the electric cycle according to variation 11 and may include a seat tube connected in the frame. A saddle may be connected to the seat tube. The seat tube may have an open interior opening into the electric power unit so that the cooling path may exit the electric power unit through the seat tube.

Variation 13 may include the electric cycle according to variation 12 wherein the seat tube may have an exhaust port that opens to the cooling path. The exhaust port may be directed at the saddle.

Variation 14 may include the electric cycle according to variation 11 wherein the electric power unit includes a housing that has an interior, and the interior may be open into the second end of the first tube.

Variation 15 may include the electric cycle according to any of variations 11 through 14 wherein the first tube may have a first segment and a second segment. The first segment may be separated from the second segment. Air may flow into the electric power unit through the first segment and air may exit the electric power unit through the second segment.

Variation 16 may include the electric cycle according to any of variations 12 through 15 and may include a seat post connecting the saddle to the seat tube. Air may exit the cooling path through the seat post.

Variation 17 may include the electric cycle according to any of variations 11 through 16 and may include a rotor connected in the electric power unit. The rotor may have an open center. A duct may be disposed between the first tube and the open center to direct air to the open center through the duct.

Variation 18 may include the electric cycle according to any of variations 11 through 17 and may include a fan positioned in the electric power unit. The fan may supplement air flow through the electric power unit.

Variation 19 may include the electric cycle according to any of variations 11 through 18 and may include a battery positioned in the electric power unit. The cooling path may be directed around the battery.

Variation 20 may involve a product for use with an electric cycle. An electric power unit may be operable to drive the electric cycle. A rotor may be configured to rotate in the electric power unit. A battery unit may be disposed in the electric power unit to provide power to rotate the rotor. A cooling path may be defined by the electric cycle, where the cooling path may direct cooling air into the electric power unit. At least one deflector may be disposed in the electric power unit to direct cooling air onto the battery unit. A crank may be manually operated and may be configured to operate with the rotor to drive the electric cycle.

The above description of select variations within the scope of the invention is merely illustrative in nature and, thus, variations or variants thereof are not to be regarded as a departure from the spirit and scope of the invention.

What is claimed is:
1. An electric cycle comprising:
   a frame including a tube and an opening, the tube extends from a first end to a second end and defines a tube interior volume in fluid communication with the opening;
   an electric power unit mounted to the frame proximal the second end of the tube and having a cooling air inlet and an exhaust port; and wherein a cooling path is defined through the tube interior volume and at least a portion of the electric power unit, the cooling path being in fluid communication with the opening so that air may flow into the opening, through the tube, into the cooling air inlet and out of the exhaust port of the electric power unit;

a rotor connected in the electric power unit, wherein the rotor has an open center, and wherein a duct is disposed between the tube and the open center to direct air to the open center; and wherein the frame further comprises a head tube that includes the opening, which opens into a head tube interior volume, the head tube being connected to the tube at the first end such that the head tube interior volume is in fluid communication with the tube interior volume and the cooling path.

2. The electric cycle according to claim 1 wherein the tube has a first segment and a second segment, the first segment separated from the second segment and wherein air flows into the cooling air inlet of the electric power unit through the first segment and exits through the exhaust port of the electric power unit and through the second segment.

3. The electric cycle according to claim 1 further comprising a fan positioned in the electric power unit, the fan supplementing air flow through the electric power unit.

4. The electric cycle according to claim 1 further comprising a battery positioned in the electric power unit, wherein the cooling path is directed around the battery.

5. An electric cycle comprising:
a frame including a first tube that has a first end and a second end,
a head tube connected to the first end,
an electric power unit mounted to the frame near the second end,
wherein a cooling path is defined through the head tube, the first tube and the electric power unit, the cooling path open through the head tube so that air may flow through the cooling path to the electric power unit for cooling; and,
a rotor connected in the electric power unit, wherein the rotor has an open center, and wherein a duct is disposed between the first tube and the open center to direct air to the open center through the duct.

6. The electric cycle according to claim 5 further comprising a seat tube connected in the frame, and a saddle connected to the seat tube; wherein the seat tube has an open interior, the open interior opening into the electric power unit so that the cooling path exits the electric power unit through the seat tube.

7. The electric cycle according to claim 6 wherein the seat tube has an exhaust port that opens to the cooling path, the exhaust port directed at the saddle.

8. The electric cycle according to claim 6 further comprising a seat post connecting the saddle to the seat tube, wherein air exits the cooling path through the seat post.

9. The electric cycle according to claim 5 wherein the electric power unit includes a housing that has an interior, the interior open into the second end of the first tube.

10. The electric cycle according to claim 5 wherein the first tube has a first segment and a second segment, the first segment separated from the second segment and wherein air flows into the electric power unit through the first segment and air exits the electric power unit through the second segment.

11. The electric cycle according to claim 5 further comprising a fan positioned in the electric power unit, the fan supplementing air flow through the electric power unit.

12. The electric cycle according to claim 5 further comprising a battery positioned in the electric power unit, wherein the cooling path is directed around the battery.

13. A product for use with an electric cycle comprising:
an electric power unit that is operable to drive the electric cycle;
a rotor configured to rotate in the electric power unit;
a battery unit disposed in the electric power unit to provide power to rotate the rotor;
a cooling path defined by the electric cycle, the cooling path directing cooling air into the electric power unit;
at least one deflector disposed in the electric power unit to direct cooling air onto the battery unit;
a crank that is manually operated, the crank configured to operate with the rotor to drive the electric cycle; and,
a rotor connected in the electric power unit, wherein the rotor has an open center, and wherein a duct is disposed between the tube and the open center to direct air to the open center.

14. An electric cycle comprising:
a frame including a tube and an opening, the tube extends from a first end to a second end and defines a tube interior volume in fluid communication with the opening;
an electric power unit mounted to the frame proximal the second end of the tube and having a cooling air inlet and an exhaust port; and wherein a cooling path is defined through the tube interior volume and at least a portion of the electric power unit, the cooling path being in fluid communication with the opening so that air may flow into the opening, through the tube, into the cooling air inlet and out of the exhaust port of the electric power unit;
a rotor connected in the electric power unit, wherein the rotor has an open center, and wherein a duct is disposed between the tube and the open center to direct air to the open center; and
wherein the frame further comprises a seat tube and a saddle supported by the seat tube;
wherein the seat tube defines an open interior, the open interior being in a fluid opening condition into the electric power unit so that air exits the electric power unit through the seat tube.

15. The electric cycle according to claim 14 wherein the seat tube has a saddle exhaust port that opens to the cooling path to allow air out of the cooling path.

16. The electric cycle according to claim 15 wherein the saddle exhaust port directs air from the cooling path and at the saddle.

17. The electric cycle according to claim 16 further comprising a seat post connecting the saddle to the seat tube, wherein air exits the cooling path through the seat post.

18. The electric cycle according to claim 14 further comprising a fan positioned in the electric power unit, the fan supplementing air flow through the electric power unit.

19. The electric cycle according to claim 14 further comprising a battery positioned in the electric power unit, wherein the cooling path is directed around the battery.

* * * * *